Patented Oct. 22, 1929

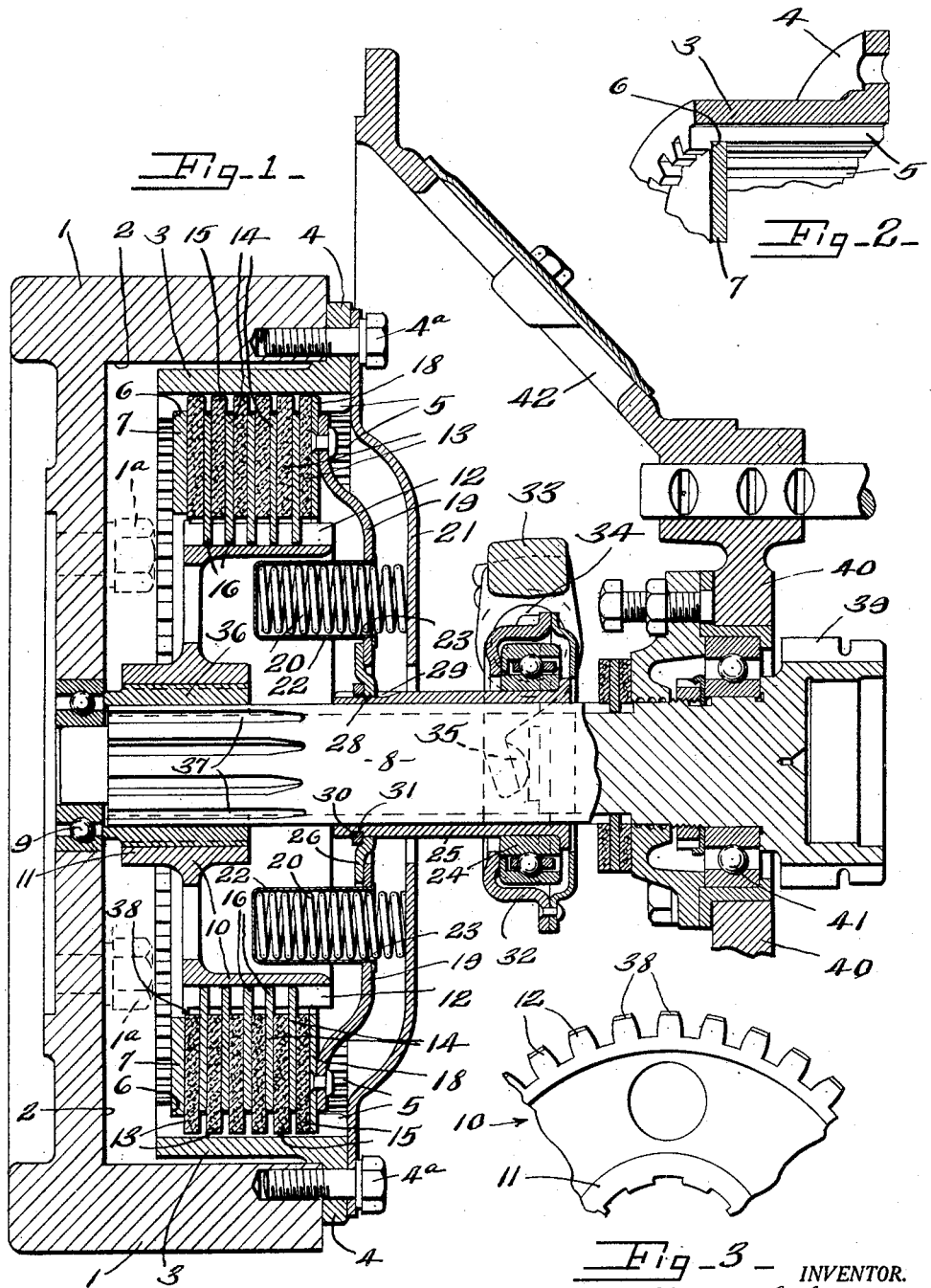

1,732,965

UNITED STATES PATENT OFFICE

GEORGE C. CARHART, OF SYRACUSE, NEW YORK, ASSIGNOR TO THE BROWN-LIPE GEAR COMPANY, OF SYRACUSE, NEW YORK, A CORPORATION OF NEW YORK

CLUTCH

Application filed February 26, 1924. Serial No. 695,360.

This invention relates to clutches such as are used in motor vehicles and has for its object a clutch which is particularly simple in construction, readily applied to the vehicle and highly efficient and durable in use, and further has for its object a disk clutch which can be readily substituted for so-called single plate clutches.

The invention consists in the novel features and in the combinations and constructions hereinafter set forth and claimed.

In describing this invention, reference is had to the accompanying drawings in which like characters designate corresponding parts in all the views.

Figure 1 is a vertical sectional view of a clutch embodying my invention.

Figure 2 is a fragmentary detail view of the outer drum.

Figure 3 is a fragmentary detail view of the inner drum.

In single plate clutches, the single friction plate between the driving and driven elements is compressed between a pressure ring and the bottom of the cylindrical recess in the driving element or flywheel of the engine; and in multiple disk clutches, the disks are contained within the drum which forms part of the clutch construction itself and which is bolted to the rear face of the driving element or the flywheel, one set of disks being slidably interlocked with said drum and the other set of such disks being slidably interlocked with the drum rotatable with the clutch shaft, the inner drum usually carrying an abutment against which the disks are compressed.

In the single plate clutch, the single plate has a hub slidably mounted on the driven shaft to rotate with such shaft and slide axially thereof. In the multiple disk clutch the inner drum mounted on the shaft does not slide axially of the shaft but the disks interlocked with such drum slide lengthwise of the drum toward an abutment carried by the inner drum. It is oftentimes desirable to substitute a multiple disk clutch for a single plate clutch or to install as regular equipment a multiple disk clutch in vehicles in which the flywheels have a cylindrical recess such as are usually provided for single plate clutches.

This invention, therefore, has for its object a multiple disk clutch, which can be substituted or used in the same situation as a single plate clutch or installed as regular equipment in flywheels having a cylindrical recess instead of having a drum self contained with the clutch mechanism bolted on the flat rear face of the flywheel.

This clutch comprises generally driving and driven elements, one of which, as the driving element, is formed with a cylindrical recess or chamber concentric with the axis of such element and with means by which friction disks can be slidably interlocked therewith and an abutment spaced apart from the bottom of the recess and the other of which elements comprises a shaft extending coaxially into said chamber, an inner drum mounted on the shaft and slidable thereon and rotatable therewith, the inner drum being arranged within the chamber, sets of interleaved disks interlocked respectively with the inner drum and the element formed with such recess or chamber, means acting on the disks to compress them toward the abutment and operating means operable when operated to relieve the disks from the action of such compressing means.

1 designates the driving element which is usually the flywheel of the internal combustion engine of the motor vehicle, this flywheel being formed with a cylindrical recess 2 arranged concentric or coaxially with the axis of the flywheel and opening through the rear face of the flywheel. The driving element or flywheel is provided with means by which the friction disks may be slidably interlocked therewith, in order that the clutch mechanism itself may be applied as a unit to the flywheel, this means as here shown comprising an outer drum 3 extending into the recess or chamber 2 from the outer side thereof and secured to the flywheel 1. The flywheel is secured to a flange on the crank shaft by bolts or screws having heads or nuts 1[a] projecting into the chamber 2. In single plate clutches, the plate is dished or bulged and clears the nuts or heads 1[a].

As here shown, the drum is formed with an annular flange 4 at its outer end which laps the rear face of the flywheel around the recess 2 and which is secured to the flywheel in any suitable manner as by screws 4a. This outer drum is formed with projections and grooves on its inner face, these being preferably in the form of internal gear teeth 5 and the drum is provided at its inner end with shoulders 6 against which a disk abutment 7 thrusts, the shoulders 6 being here shown as formed at the inner ends of the teeth 5. Usually the outer drum is formed with an internal annular shoulder and the teeth 5 cut, the tool cutting through the annular shoulder leaving the shoulders 6 at the inner ends of the teeth and at the inner end of the drum as shown in Figure 2. Owing to the abutment being spaced from the bottom of the chamber 2, space is left for the heads 1a of the bolts before mentioned.

The driven element of the clutch comprises the usual shaft 8 projecting coaxially into the chamber 2 and having a pilot bearing at 9 in the flywheel 1, an inner drum 10 having a hub 11 mounted on the shaft 8 to slide axially thereof and to rotate with the shaft 8, this drum having peripheral projections or gear teeth 12 opposed to the internal teeth 5 of the outer drum 3. 13 and 14 are sets of interleaved disks slidably interlocked with the outer drum 3 and the inner drum 10. the disks 13 having teeth 15 interlocked with the teeth 5 of the drum and the disks 14 having internal teeth 16 interlocked with the teeth 12 of the inner drum 10.

The disks are compressed toward the abutment 7 by spring means of any suitable construction, that here shown being a compressing ring 18 secured to a plate 19, which is pressed inwardly usually by a plurality of springs 20 thrusting at their rear ends against a back plate 21 and at their front or inner ends against the heads of thimbles 22 arranged in openings 23 in the plate 19, there being a plurality of such springs spaced equidistant apart around the shaft 8 and any number of springs required to obtain a predetermined compression may be used. The back plate 21 is secured to the flywheel usually by the same screws 4a that secure the outer drum 3 to the flywheel.

The springs 20 act to compress the disks 13 and 14 toward the abutment 7 and operating means of any suitable construction are provided for relieving the disks of the action of the springs 20. This means, as here shown, comprises a throwout collar of any suitable construction, designated by the reference numeral 24, mounted on a sleeve 25 slidable on the shaft 8 and having a collar 26 at its inner end which laps or interlocks with the plate 19 to which the pressure ring 18 is secured. The collar 26, as here illustrated, is secured to the sleeve 25 by a tongue or key 28 projecting inwardly from the collar 26 into a lengthwise keyway 29 in the sleeve 25 and a lock ring 30 which snaps into a peripheral groove 31 in the sleeve 25 adjacent the inner side of the collar 26. Owing to the connection between the collar 26 and the plate 19, the collar has a universal joint action and can conform to misalinement between the shaft 8 or sleeve 25 and the pressure ring so that the springs 20 press equally on the plate 19 and the equal action thereof is not affected by misalinement of the shaft 8 or sleeve 25 relatively to the disks or the compression ring 19.

The throwout collar 24 is inclosed in a suitable housing 32. This collar is operated by the usual yoke 33 mounted upon a shaft 34 journaled in the clutch housing and operable by the usual clutch pedal, the yoke having arms 35 on opposite sides of the shaft 8 and sleeve 25, which arms thrust against the housing 32 on diametrically opposite sides of the shaft 8.

Obviously, as the foot pedal is depressed, the yoke 33 will be moved to shift the arms 35 rearwardly and thus shift the throwout collar 24 and sleeve 25 rearwardly and withdraw the plate 19 against the action of the springs 20, and permit the disks 13 and 14 to disengage.

In single plate clutches, the single plate has a hub which slides on the driven shaft 8 and in multiple disk clutches, the inner drum ordinarily does not have the sliding movement, therefore, in placing multiple disk clutches in the same situation that single plate clutches are used provision must be made for a possible sliding corresponding to the sliding of the single plate. In this multiple disk clutch, the abutment 7 is carried by the outer drum and the inner drum is keyed or otherwise secured to a sleeve or collar 36 mounted on the shaft 8 which is usually provided with splines 37, and the bore of the sleeve 36 is formed with complemental splines.

Undue forward displacement of the inner drum 10 is prevented by the sleeve 36 abutting against the flywheel and undue rearward displacement is prevented by shoulders 38 at the inner ends of the peripheral teeth of the inner drum 10, these shoulders 38 clearing the inner edges of the foremost disk 13 interlocked with the outer drum 3 and engaging the foremost disk 14 of the set interlocked with the inner drum 10.

The shaft 8 is usually the driving gear of a transmission gearing and is provided with a gear 39 at its rear end which is located in the transmission gear casing 40, the shaft 8 being journalled in a bearing 41 in the transmission gear casing. The clutch housing 42 projects from the transmission gear housing 40 and is secured to the engine casing all in the usual manner.

What I claim is:

The combination of a driver formed with a recess for receiving a clutch, a disk clutch comprising a shaft having a pilot bearing mounted in the driver, an inner drum slidably mounted on the shaft within the recess and connected to the shaft to rotate therewith, an outer drum extending into the recess and terminating short of the bottom of the recess, the inner drum terminating short of the inner end of the outer drum, sets of interleaved disks interlocked respectively with the drums, the drums being formed with external and internal teeth projections respectively for interlocking with the sets of disks, the teeth of the outer drum having shoulders at their inner ends and a disk abutment associated with the outer drum and abutting against said shoulders, a pressure plate acting on the disks to compress them toward the abutment, and spring means and throw-out means connected to the pressure plate to act thereon in opposite directions, the inner drum having means for thrusting against the driver to limit axial movement in one direction and also having shoulders at the inner ends of its teeth for coacting with the disks interlocked with the inner drum to prevent undue axial shifting of the inner drum in the other direction.

In testimony whereof, I have hereunto signed my name, at Syracuse, in the county of Onondaga, and State of New York, this 8th day of Feb., 1924.

GEORGE C. CARHART.